US011693889B2

(12) United States Patent
Naskar et al.

(10) Patent No.: US 11,693,889 B2
(45) Date of Patent: Jul. 4, 2023

(54) EFFECTIVE MATERIALIZATION STRATEGY UTILIZING STATISTICAL SET-THEORETIC APPROACH FOR GENERATION OF MULTI-INTERVAL MULTI-COLUMN HISTOGRAM AND HISTOGRAMS IN GENERAL

(71) Applicant: Hewlett Packard Enterprise Development LP, Houston, TX (US)

(72) Inventors: Subrata Naskar, Bangalore (IN); Naveen Jaladhihalli Parameswarappa, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 543 days.

(21) Appl. No.: 16/416,097

(22) Filed: May 17, 2019

(65) Prior Publication Data
US 2020/0311109 A1 Oct. 1, 2020

(30) Foreign Application Priority Data

Mar. 28, 2019 (IN) .............................. 201941012274

(51) Int. Cl.
G06F 7/00 (2006.01)
G06F 16/28 (2019.01)
G06F 7/16 (2006.01)
G06F 16/22 (2019.01)

(52) U.S. Cl.
CPC .............. *G06F 16/287* (2019.01); *G06F 7/16* (2013.01); *G06F 16/221* (2019.01)

(58) Field of Classification Search
CPC ......... G06F 16/221; G06F 16/287; G06F 7/16
USPC ................ 707/609, 737, 738, 718, 722, 748
See application file for complete search history.

(56) References Cited

U.S. PATENT DOCUMENTS

| 5,870,752 A | 2/1999 | Gibbons et al. |
| 7,171,408 B2 | 1/2007 | Zuzarte |
| 8,161,374 B2 | 4/2012 | Haberl |
| 9,678,999 B1 | 6/2017 | Gibas et al. |
| 10,114,846 B1 | 10/2018 | Shah et al. |
| 11,422,805 B1 * | 8/2022 | Kelly ..................... G06F 7/766 |

(Continued)

OTHER PUBLICATIONS

Oracle, "Database SQL Tuning Guide," copyright 2013, 2017, https://docs.oracle.com/database/121/TGSQL/tgsql_histo.htm#TGSQL366.

*Primary Examiner* — Md I Uddin
(74) *Attorney, Agent, or Firm* — Trop, Pruner & Hu, P.C.

(57) ABSTRACT

Various aspects of the subject technology relate to methods, systems, and machine-readable media for generating histograms according to a set-theoretic approach. The method includes receiving a command to generate at least one histogram from selected data, the selected data comprising a plurality of column groups. The method also includes identifying a superset from the plurality of column groups. The method also includes materializing, in a memory, a superset multi-column group for the superset. The method also includes identifying at least one subset of the superset from the plurality of column groups, the at least one subset comprising at least one column group. The method also includes processing the at least one subset of the superset to form a grouped resultset. The method also includes generating the at least one histogram for the grouped resultset of the at least one subset of the superset.

18 Claims, 5 Drawing Sheets

(56) References Cited

U.S. PATENT DOCUMENTS

| | | | |
|---|---|---|---|
| 2010/0114976 A1* | 5/2010 | Castellanos | G06F 16/22 |
| | | | 707/803 |
| 2015/0149402 A1* | 5/2015 | Gupta | G06F 16/254 |
| | | | 707/602 |
| 2015/0220617 A1 | 8/2015 | Luo et al. | |

* cited by examiner

UPDATE STATISTICS FOR TABLE <tablename> on c1,c2,c3; // three single column group UPDATE STATISTICS FOR TABLE <tablename> c1,(c2,c3); // one single column, and one multi-column group UPDATE STATISTICS FOR TABLE <tablename> (c1,c2),c3; // one multi-column group and a single column group UPDATE STATISTICS FOR TABLE <tablename> (c1,c3),c2; // one muulti-column group and a single colum group UPDATE STATISTICS FOR TABLE <tablename> (c1,c2,c3),(c1,c2)(c1,c3),(c2,c3),c1,c2,c3; Four multi-column groups and three single column

FIG. 1

EFFECTIVE MATERIALIZATION STRATEGY UTILIZING STATISTICAL SET-THEORETIC APPROACH FOR GENERATION OF MULTI-INTERVAL MULTI-COLUMN HISTOGRAM AND HISTOGRAMS IN GENERAL

CROSS-REFERENCE TO RELATED APPLICATION

The present application claims the benefit of priority under 35 U.S.C. § 119 to Indian Patent Application No. 201941012274, entitled "EFFECTIVE MATERIALIZATION STRATEGY USING STATISTICAL SET-THEORETIC APPROACH FOR GENERATION OF MULTI-INTERVAL MULTI-COLUMN HISTOGRAM AND IN GENERAL FOR HISTOGRAM," filed on Mar. 28, 2019, the disclosure of which is hereby incorporated by reference in its entirety for all purposes.

BACKGROUND

Histograms provide an approximately accurate representation of the distribution of numerical data by displaying the probability distribution of a continuous variable. To construct a histogram, the first step is to form a grouped and ordered resultset. The entire range of grouped unique resultset values is then divided into a series of intervals, where a particular total number of user guided intervals is less than the grouped unique ordered resultset. It may then be counted how many values fall into each interval. The bins are usually specified as consecutive, non-overlapping intervals of a variable.

Structured Query Language (SQL) is a domain-specific language used in programming and designed for managing data held in a relational database management system (RDBMS), or for stream processing in a relational data stream management system (RDBMS). SQL is particularly useful in handling structured data where there are relations between different entities/variables of the data. SQL may be utilized to generate histograms from voluminous data for various purposes, such as data analytics. However, single and multi-column histogram generation is very computationally expensive in terms of elapsed time and overhead of processing in the SQL compiler. Therefore, there is a need for efficient generation of histograms that overcome these deficiencies.

BRIEF DESCRIPTION OF THE DRAWINGS

The following detailed description references the drawings, wherein:

FIG. 1 illustrates examples of supersets and corresponding subsets;

Figure 2:
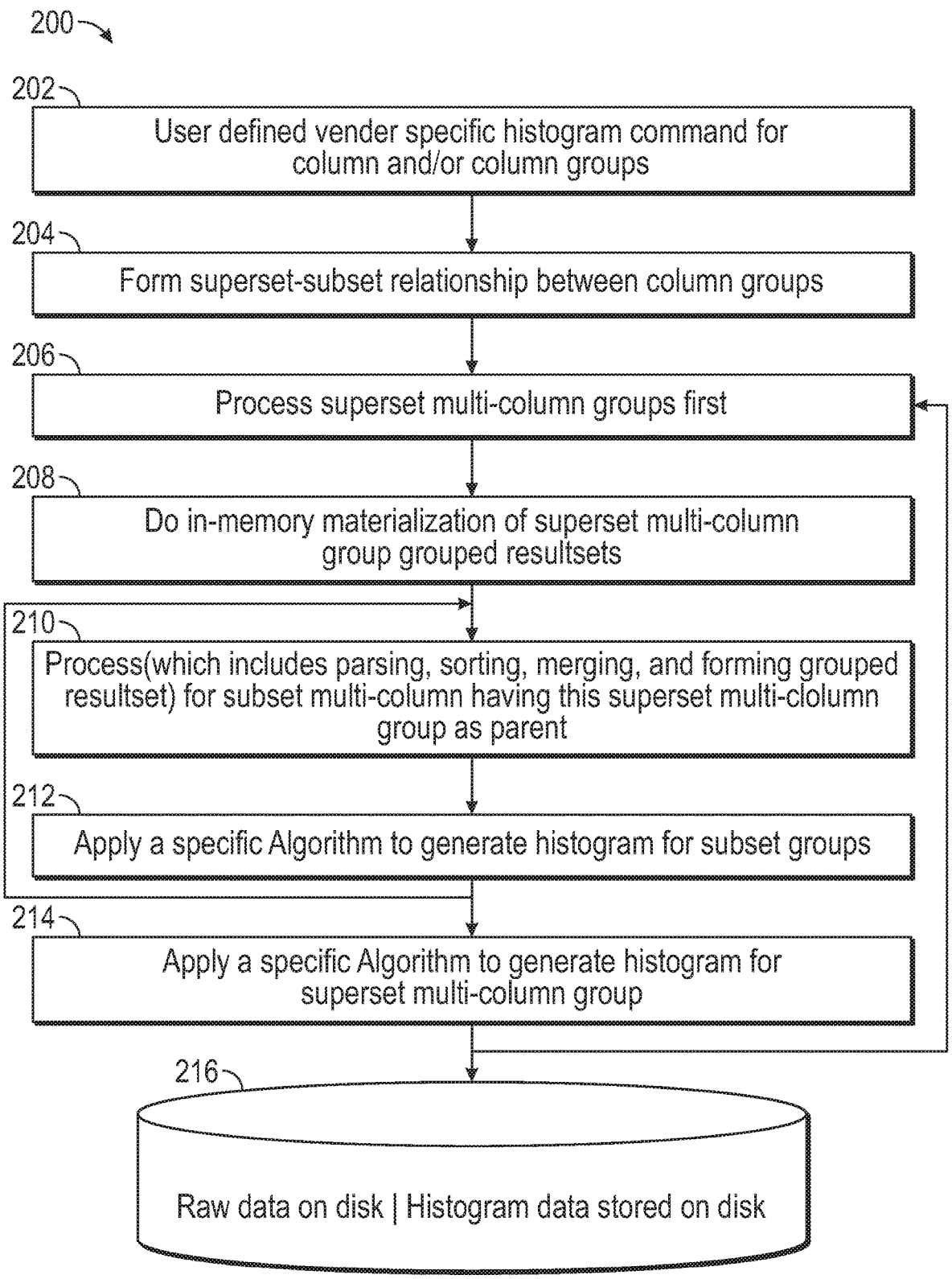
FIG. 2 illustrates an example process for generating a histogram utilizing a set-theoretic approach.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

Single and multi-column histogram generation in general can be expensive in terms of elapsed time and overhead of processing and utilizing in a SQL compiler. However, it plays a significant role in deriving relationships between columns of a table, and hence has a direct impact on plan quality while the SQL compiler generates an optimal plan for a query. It is not uncommon to see quite a bit of spike in elapsed time when histogram generation is performed on several multi-column groups, or multiple single column groups, despite the efficiency of the underlying histogram generation algorithms in effect, since the underlying data also plays an important role.

This disclosure proposes generation of multi-column histograms while also minimizes the overhead of disk I/O when a multi-column group follows a subset relationship in a set theoretic approach. In other words, each multi-column group can be considered as a set to derive a parent-child relationship. For example, a child set of columns for a multi-column group may be a subset of a parent multi-column group. The disclosed methods can also be applied to generate histograms when a superset-subset relationship between column groups is not present initially. A superset-subset relationship may be generated between single column groups as well, and the concept remains applicable.

According to an aspect of the present disclosure, a table T may include n numbers of columns: $c_1, c_2 \ldots c_n$. A user may desire to generate a histogram through an update statistics command for the following multi-column groups: $(c_1, c_2, c_m), (c_1, c_2, c_3), (c_1, c_{m-1})$ where m<n. The conventional way of performing the update statistics command utilizes three logical disk I/O's (e.g., READ I/O's s) and three sort's (i.e., one for each multi-column group). It is further noted that if n single column histograms are specified by the user, then n logical disk I/O's will also need to be performed to generate n histograms for the columns. It is understood that logical disk I/O is an abstraction of physical disk I/O, or logical disk I/O≤physical disk I/O.

The disclosed methods, systems, and machine-readable media address a problem in traditional histogram generation techniques tied to computer technology, namely the technical problem of generating histograms efficiently with low disk I/O overhead. The disclosed methods, systems, and machine-readable media solve this technical problem by providing a solution also rooted in computer technology, namely, by identifying multi-column groups as supersets to derive a parent-child relationship with subsets, which reduces overhead by optimizing computer resources, such as by reducing disk I/O (e.g., READ DISK I/O).

The disclosed subject technology further provides improvements to the functioning of the computer itself because it increases efficiency in generation of histograms.

FIG. 1 illustrates examples of supersets and corresponding subsets. As illustrated, commands 100 for generating histograms may include single column groups 102 and multi-column groups 104. For example, the commands 100 may be for execution on an SQL compiler. According to an aspect, the single column groups may be c1, c2, and c3, and the multi-column groups may be (c1, c2, c3), (c1, c2), (c1, c3), and (c2, c3). It is understood that this list is exemplary only, and additional columns may be included. It is further understood that the column groups may be a part of a larger dataset, such as having the form (c1, c2, int, c3, varchar). It is understood that this dataset is exemplary only and other datasets having the relevant column groups are possible.

In an implementation, the multi-column group (c1, c2, c3) may be identified as a superset 106, and the other multi-column groups (c1, c2), (c1, c3), and (c2, c3) may be identified as subsets 108 of the superset 106. The single column groups c1, c2, and c3 may also be identified as subsets of the superset 106. This is because the superset 106 (c1, c2, c3) is the union of the subsets 108, according to set theory. It is understood that the multi-column group (c1, c2, c3) is exemplary only, and other multi-column groups having more than three column groups, or less than three column groups is possible.

According to conventional methods, generating a histogram from the single column groups 102 and the multi-column groups 104 would require multiple physical disk I/Os (e.g., one logical disk I/O for each of the single column groups 102 and the multi-column groups 104). However, by identifying the superset 106 and the subsets 108, a parent-child relationship between the column groups is established, which saves physical disk I/Os, as will be described in further detail below. For example, one logical I/O forms the superset 106, which is utilized to form the subsets 108, rather than seven logical I/Os (i.e., one for each of the single column groups 102 and the multi-column groups 104). It is understood that one logical I/O may include n physical I/O's.

It is understood that each column group may include multiple data sets, each with their own frequency (e.g., row count) and unique entry count (UEC). It is further understood that the commands are exemplary only, and may be executed on compilers including, but not limited to, SQL and other similar database compilers.

FIG. 2 illustrates an example process 200 for generating a histogram utilizing a set-theoretic approach. According to an aspect, the process 200 begins at step 202 where a user issues a histogram command for a column and/or column groups. For example, the command may include the commands 100 of FIG. 1. The column groups may include the single column groups 102 and multi-column groups 104 of FIG. 1.

At step 204, a superset-subset relationship between the column groups may be formed. For example, as described in FIG. 1, the superset 106 may be (c1, c2, c3), and the subsets 108 may include the other single column groups 102 and multi-column groups 104. At step 206, the superset multi-column group (e.g., superset 106) may be processed first. This may include in-memory materialization of superset resultsets, at step 208. It is understood that a single column can also be considered as a subset of the superset multi-column group.

At step 210, the subsets (e.g., subsets 108) may be processed, including parsing, sorting, merging, and forming grouped resultsets for the subsets. For example, the subsets may have the superset as a parent. At step 212, a specific algorithm (e.g., from SQL) may be applied to generate histograms for the subsets. It is understood that steps 210 and 212 may be included in a loop as needed to process each subset. According to an aspect, if prompted by the user, at step 214 the specific algorithm may be applied to generate a histogram for the superset.

According to additional aspects of the present disclosure, a superset multi-column group (e.g., superset 106) may first be formed. Subsequently, the superset multi-column group may be categorized into two categories for subset histograms generation. The first category may include the case where a prefix/leading column in the subset multi-column groups (e.g., subsets 108) is the same as super-set multi-column group. For example, consider a case where histograms are to be generated for the multi-column groups (c1, c2, c3, c4, c5, c6), (c1, c2, c3), (c2, c3, c5), and (c1, c5, c6), where (c1, c2, c3, c4, c5, c6) is the superset and (c1, c2, c3), (c2, c3, c5), and (c1, c5, c6) are the subsets. The subset (c1, c2, c3) includes the same prefix/leading column as the superset, which is c1. In this case, the subset (c1, c2, c3) does not require any sort operation to form the grouped resultset for the subset (c1, c2, c3).

The second category may include the case where the prefix/leading columns in the subset multi-column groups differs from the prefix/leading column in the superset multi-column group. For example, in the above case the subset (c2, c3, c5) has a prefix/leading column of c2, which is not the same prefix/leading column as the superset (c1, c2, c3, c4, c5, c6), which is c1. As a result, an in-memory sort and merge is performed to form the grouped resultset for the subset multi-column groups on which the histogram generation algorithm is to be applied. It is understood that for both categories, row count (e.g., frequency) and unique entry count (UEC) adjustments are to be performed. Additional ordering can be derived for the subset groups from the superset group as necessary.

Finally, at step 216, raw data related to the generation of the histograms may be stored to memory on a disk. For example, the raw data may be in regards to the superset multi-column group and single column group as well. The data format may be in row format/column format. Read I/O's that may be retrieved for superset group may be manifested in generating histogram on disk as per user defined specifications. It is understood that disk I/O savings may apply to read I/O, whereas write I/O is per user directive.

According to additional aspects, generated histograms may be flushed for all column groups, including single column groups. An optimal value for a maximum number of columns may be considered in forming the superset multi-column group. The optimal value may be determined based on optimization of computer resources, where a primary component is disk I/O.

As described herein, industry standard databases may effectively use the described approach to generate histograms of subsets of whole index minimization of disk I/O, and particularly read I/O's, utilization which gets used effectively for selectivity estimation strategy.

Figure 3:
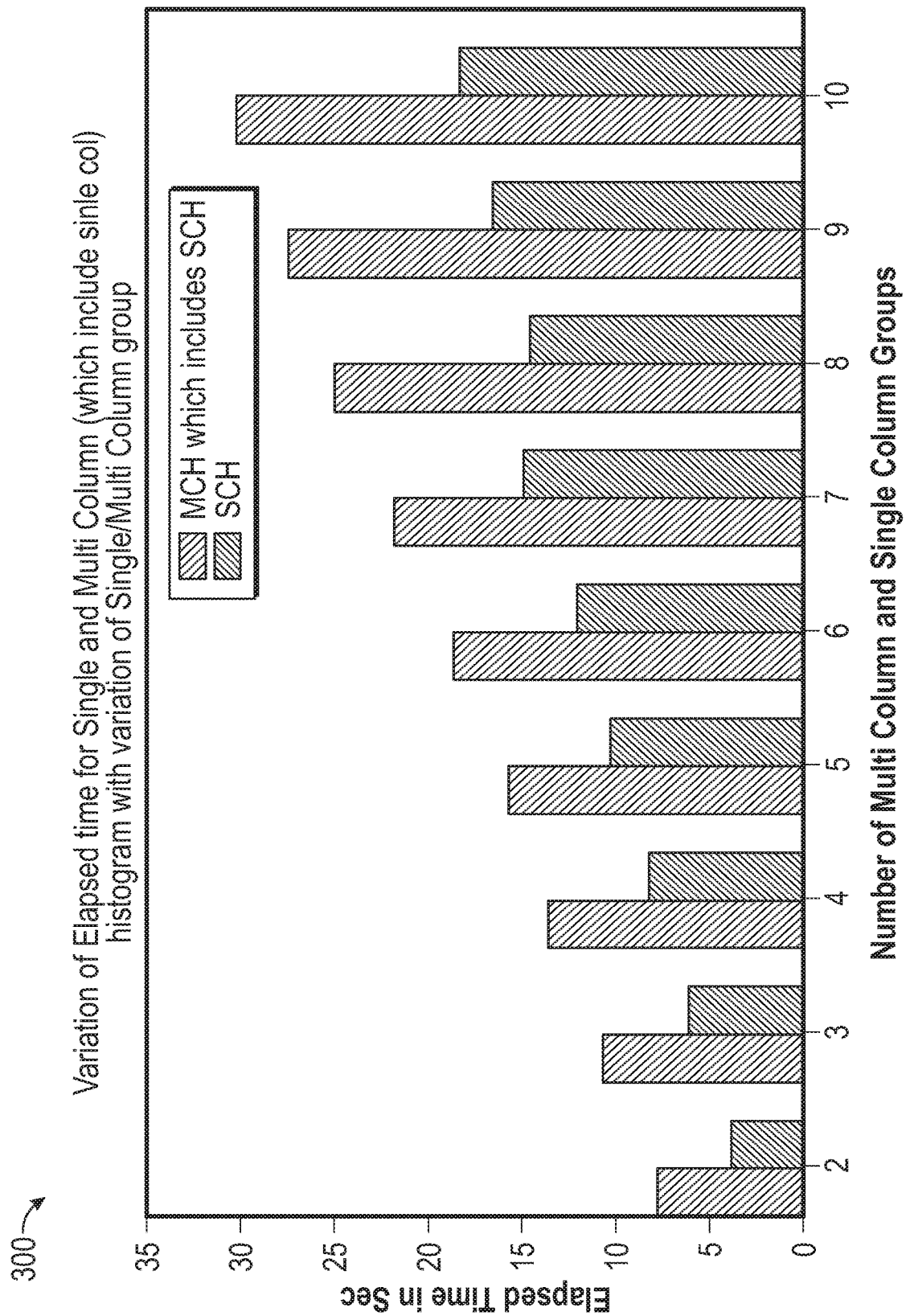
FIG. 3 shows performance of the described methods.

FIG. 3 shows a chart 300 illustrating performance of the described techniques. As depicted, the chart 300 shows how single column histograms can be generated from multi-column groups utilizing the described techniques for a fixed number of histogram intervals, irrespective a histogram generation algorithm. The chart 300 also shows how the described techniques minimize the overhead for histogram generation of multi-column groups. In the chart 300, histogram representation for multi-column groups include one superset multi-column group and n single column groups.

For example, as illustrated in the chart 300, the variation of elapsed time for single and multi-column histograms is compared against the variation of elapsed time for single column groups. In each case, the single column groups exhibit almost half the elapsed time of the multi-column groups which also include single column groups.

The chart 300 also confirms that the following relationship holds:

$$\frac{d\left(\begin{array}{c}\text{Superset}-\text{read}-\\\text{group}-\text{sortcost}\end{array}\right)}{d(\text{column})} + \frac{d(Cpu-time')}{d(\text{column})} \leq$$

$$M * \frac{d\left(\begin{array}{c}Cavg-\text{subset}-\\\text{read}-\text{group}-\text{sortcost}\end{array}\right)}{d(\text{column group})} + M * \frac{d\left(\begin{array}{c}Avg.Cpu-\\time\end{array}\right)}{d(\text{column group})}$$

where the cost of forming the superset group and materializing subset groups from superset group is effective if and only if an elapsed time for the superset group histogram generation is less than or equal to an elapsed time for histogram generation of the subset groups.

For example, consider a table T having n number of columns: $c_1, c_2, \ldots, c_i, \ldots, c_n$. Next, assume that a user/customer desires to generate histogram for the following multicolumn groups with the following command: update statistics for table T on $(c_1, c_2, \ldots, c_i, \ldots, c_m)$, $(c_1, c_2, c_3)$, $(c_1, c_{m-1})$ where m<n. The usual way to perform update statistics needs three disk I/O's and three sorts (e.g., one for each multi-column group). Here, there are three groups $(c_1, c_2, c_m), (c_1, c_2, c_3), (c_1, c_{m-1})$. If n single column or n multi-column histograms are specified by the user, then n logical disk I/O's need to be performed to have grouped results, which is the source for the specific histogram algorithm to generate the n histograms for the columns. It is understood that one logical I/O may consist of one or more physical disk I/Os.

The Cost of forming of a histogram (e.g., applicable for single column and multi-column groups) may be defined as the sum of: cost of generation of intermediate grouped and sorted resultset for the single column/multi-column group including scan cost of data from disk, cost of applying a specific histogram algorithm on the intermediate grouped resultset to generate number of interval buckets/bins along with frequency/number of occurrences/UEC and rowcount for the bin, and cost of storing/writing histogram data on disk. Cost may be expressed in terms of Elapsed Time.

Therefore, the Cost of forming the superset group and materializing subset-groups from the superset group is effective if and only if Elapsed Time for the superset group histogram generation ($E_{lapsedTime\ For\ superset-group}$) is less than or equal to Elapsed Time for histogram generation of subset groups ($E_{lapsedTime\ For\ subset-groups}$). In other words, if and only if the rate of change of Elapsed Time for a superset group with an addition/change of a column in a superset column group is less than or equal to rate of change of Elapsed Time for subset group(s) with addition/change of a subset group, the following condition holds:

$$\frac{d\left(\begin{array}{c}ElapsedTime-\\\text{superset}-\text{group}\end{array}\right)}{d(\text{column})} \leq \frac{d(ElapsedTime-\text{subset}-\text{groups})}{d(\text{columngroup})}$$

$C_{read-group-sort\ cost}$: Unit Cost of forming one grouped resultset for one single column/multi-column group or cost of one logical I/O plus sort, group cost, $C_{histogram-writeI/O}$: Unit Cost of one logical write I/O of histogram intervals generated, $C_{avg-subset-read-group-sort\ cost}$: $\Sigma^M C_{subset-read-group-sort\ cost}/M$, where M is the number of logical I/O's for histogram generation of M single column/multi-column group or equivalently total number of histograms which needs to be generated (e.g., an abstraction of physical I/O), $C_{avg-writeI/O}$: $\Sigma^M C_{histogram-writeI/O}/M$, $C_{superset-read-group-sort\ cost}$: Cost for scanning data from disk, projecting columns in relevance, sorting and grouping for forming the grouped result-set for one super set group instead of multiple subset groups, Cpu-time: Cost of a specific algorithm to generate a histogram on grouped resultset in terms of computation time, Avg.Cpu-time: $\Sigma^M$ Cpu-time/M, Cpu-time', which differs from Cpu-time, in the aspect that it includes in-memory processing time for parsing of superset grouped resultset, sorting (if relevant), merging and reforming subset single/multi-column group apart from processing time for histogram generation.

Note that, one logical I/O can span over multiple disk I/O reads or disk I/O writes.

So, for M subset-groups: $C_{subset-groups-total}=$
$M*C_{avg-subset-read-group-sort\ cost}+M*(Avg.Cpu-time)+M*C_{avg-write\ I/O}$  Equation (1)

Differentiating based on the above results in:

$$\frac{d\left(\begin{array}{c}Csubset-\\\text{groups}-\text{total}\end{array}\right)}{d(columngroup)} = M * \frac{d\left(\begin{array}{c}Cavg-\text{subset}-\\\text{read}-\text{group}-\text{sort cost}\end{array}\right)}{d(\text{column group})} +$$

$$M * \frac{d\left(\begin{array}{c}Avg.Cpu-\\time\end{array}\right)}{d(columngroup)} + M * \frac{d\left(\begin{array}{c}Cavg-\\writeI/O\end{array}\right)}{d(columngroup)}$$

Equation (3)

So, for superset groups:

$C_{superset-group(s)-total}=1*C_{superset-read-group-sort\ cost}+$
Cpu-time'+$M*C_{avg-writeI/O}$  Equation (2)

Note that, the "1" in Equation (2) corresponds to one logical I/O for superset group, since one superset multicolumn grouped resultset is needed to be formed, which works as the input for materialization by subset groups to generate histograms for the superset group (if applicable) and for multiple subset groups.

Differentiation of Equation (2) against d(column) provides the following:

$$\frac{d\left(\begin{array}{c}Csuperset-\\\text{groups}-\text{total}\end{array}\right)}{d(\text{column})} =$$

$$\frac{d\left(\begin{array}{c}Csuperset-\text{read}-\\\text{group}-\text{sort cost}\end{array}\right)}{d(\text{column})} + \frac{d\left(\begin{array}{c}Cpu-\\time'\end{array}\right)}{d(\text{column})} + M * \frac{d\left(\begin{array}{c}Cavg-\\writeI/O\end{array}\right)}{d(\text{column})}$$

Equation (4)

So from Equation (3) and Equation (4) the condition as mentioned earlier takes the following form:

$$\frac{d\left(\begin{array}{c}Cavg-\text{superset}-\text{read}-\\\text{group}-\text{sort cost}\end{array}\right)}{d(\text{column})} + \frac{d(Cpu-time')}{d(\text{column})} + M * \frac{d\left(\begin{array}{c}Cavg-\\writeI/O\end{array}\right)}{d(\text{column})} \leq$$

$$M * \frac{d\left(\begin{array}{c}Cavgsubset-\text{read}-\\\text{group}-\text{sort cost}\end{array}\right)}{d(\text{column group})} +$$

$$M * \frac{d\left(\begin{array}{c}Avg.Cpu-\\time\end{array}\right)}{d(\text{column group})} + M * \frac{d\left(\begin{array}{c}Cavg-\\writeI/O\end{array}\right)}{d(\text{column group})}$$

Or, in other words, ignoring/approximating the write I/O terms: M*

$$\frac{d(Cavg-writeI/O)}{d(\text{column})}, M*\frac{d(Cavg-writeI/O)}{d(\text{column group})}$$

from the above equation yields:

$$\frac{d\left(\begin{array}{c}Csuperset-\text{read}-\\ \text{group}-\text{sort cost}\end{array}\right)}{d(\text{column})}+\frac{d\left(\begin{array}{c}Cpu-\\ time'\end{array}\right)}{d(\text{column})} \leq \qquad \text{Equation (5)}$$

$$M*\frac{d\left(\begin{array}{c}Cavgsubset-\text{read}-\\ \text{group}-\text{sort cost}\end{array}\right)}{d(\text{column group})}+M*\frac{d\left(\begin{array}{c}Avg.Cpu-\\ time\end{array}\right)}{d(\text{column group})}$$

It is understood that the write I/O terms may be ignored/approximated because write I/O for histogram generation is fixed/constant. Additionally, the approach disclosed focuses primarily on DISK READ I/O optimization.

Referring back to the chart 300 of FIG. 3, for the set of data, logical disk I/O M=3 (e.g., histogram generation was performed on 3 multi-column groups). It is noted that Equation (5) holds as well for other data sets having M>3. It is understood that the terms in the above equation will vary for different datasets.

Calculations relating to FIG. 3 are as follows:

$$\frac{d(Csuperset-\text{read}-\text{group}-\text{sort cost})}{d(\text{column})}=0.002$$

$$\frac{d(Cpu-time')}{d(\text{column})}=3.380$$

$$\frac{d(Cavg-\text{subset}-\text{read}-\text{group}-\text{sort cost})}{d(\text{column group})}=0.055$$

$$\frac{d(Avg.Cpu-\text{time})}{d(\text{column group})}=4.895$$

which confirm that the techniques described minimize DISK READ I/O for histogram generation with some additional costs of CPU time.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
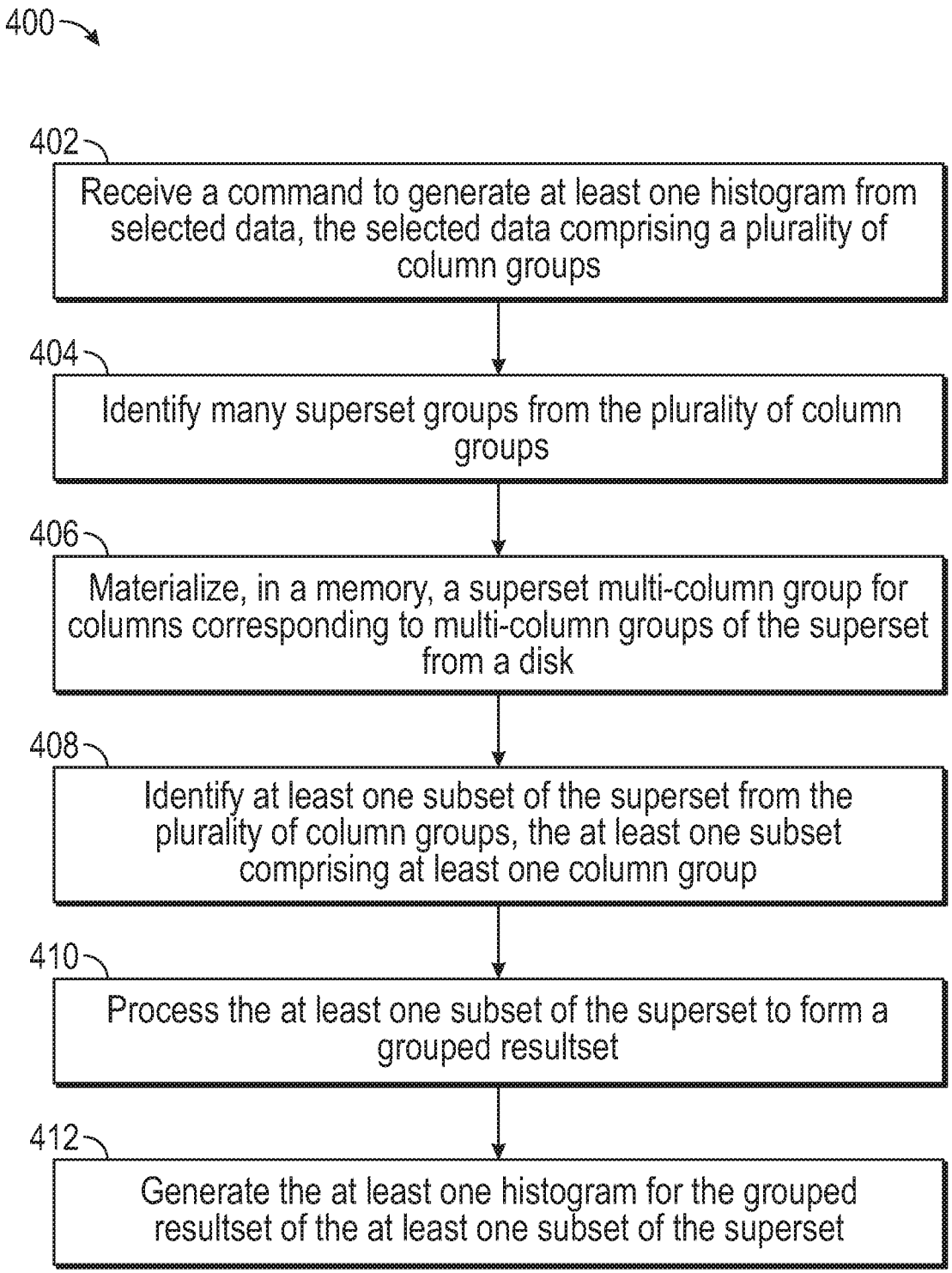
FIG. 4 illustrates an example flow diagram for generating a histogram utilizing a set-theoretic approach.

FIG. 4 illustrates an example flow diagram (e.g., process 400) for generating a histogram utilizing a set-theoretic approach. For explanatory purposes, the example process 400 is described herein with reference to FIG. 1. Further, for explanatory purposes, the blocks of the example process 400 are described herein as occurring in serial, or linearly. However, multiple blocks of the example process 400 may occur in parallel. In addition, the blocks of the example process 400 need not be performed in the order shown and/or one or more of the blocks of the example process 400 need not be performed. For purposes of explanation of the subject technology, the process 400 will be discussed in reference to FIG. 1.

At block 402, a command is received to generate at least one histogram from selected data. The selected data may include a plurality of column groups. At block 404, a superset is identified from the plurality of column groups. For example, many superset groups from the plurality of column groups may be identified. At block 406, a superset multi-column group is materialized in-memory for the superset comprising columns. For example, a superset multi-column group may be materialized for columns corresponding to multi-column groups of the superset from a disk. At block 408, at least one subset of the superset is identified from the plurality of column groups. The at least one subset may include at least one column group. At block 410, the at least one subset of the superset is processed to form a grouped resultset. At block 412, the at least one histogram is generated for the grouped resultset of the at least one subset of the superset.

In an implementation, a command (e.g., command 100) is received to generate at least one histogram from selected data. The selected data may include multiple column groups (e.g., single column groups 102 and/or multi-column groups 104). A superset (e.g., 106) may be formed from the multiple column groups. A superset multi-column group may be materialized in-memory based on the superset. A subset (e.g., subset 108) of the superset may be formed from the multiple column groups. The subset may include at least one column of the multiple column groups. The subset may be processed to form a grouped resultset. A histogram may be generated for the grouped resultset of the subset.

According to an aspect, the process 400 further includes generating a histogram for the superset comprising the superset multi-column group. For example, the histogram for the superset multi-column group may be generated only when prompted by the user.

According to an aspect, the process 400 further includes identifying that a subset prefix column of the subset is same as a superset prefix column of the superset. For example, if the subset prefix column of the subset is same as a superset prefix column of the superset, then a row count (e.g., frequency) and unique entry count (UEC) adjustments may be performed.

According to an aspect, the process 400 further includes identifying that identifying that a subset prefix column of the subset is different from a superset prefix column of the superset. The process 400 further sorts and merges, in the memory, the selected data to form the grouped resultset.

According to an aspect, the process 400 further includes performing rowcount and unique entry count (UEC) adjustments on the selected data. For example, an in-memory sort and merge is performed to form a grouped resultset for the subset multi-column groups on which the histogram generation algorithm is to be applied. Additionally, a row count (e.g., frequency) and UEC adjustments may be performed. Further ordering may be derived for the subset groups from the superset group as necessary.

According to an aspect, the process 400 further includes setting a maximum number of columns to be considered to materialize the superset multi-column group. For example, the maximum number of columns may be user defined according to the relationship described above in relation to Equation (5).

According to an aspect, the process 400 further includes storing, in the memory, the selected data utilized to generate the at least one histogram. According to an aspect, the process 400 further includes flushing generated histograms for all column groups.

Figure 5:
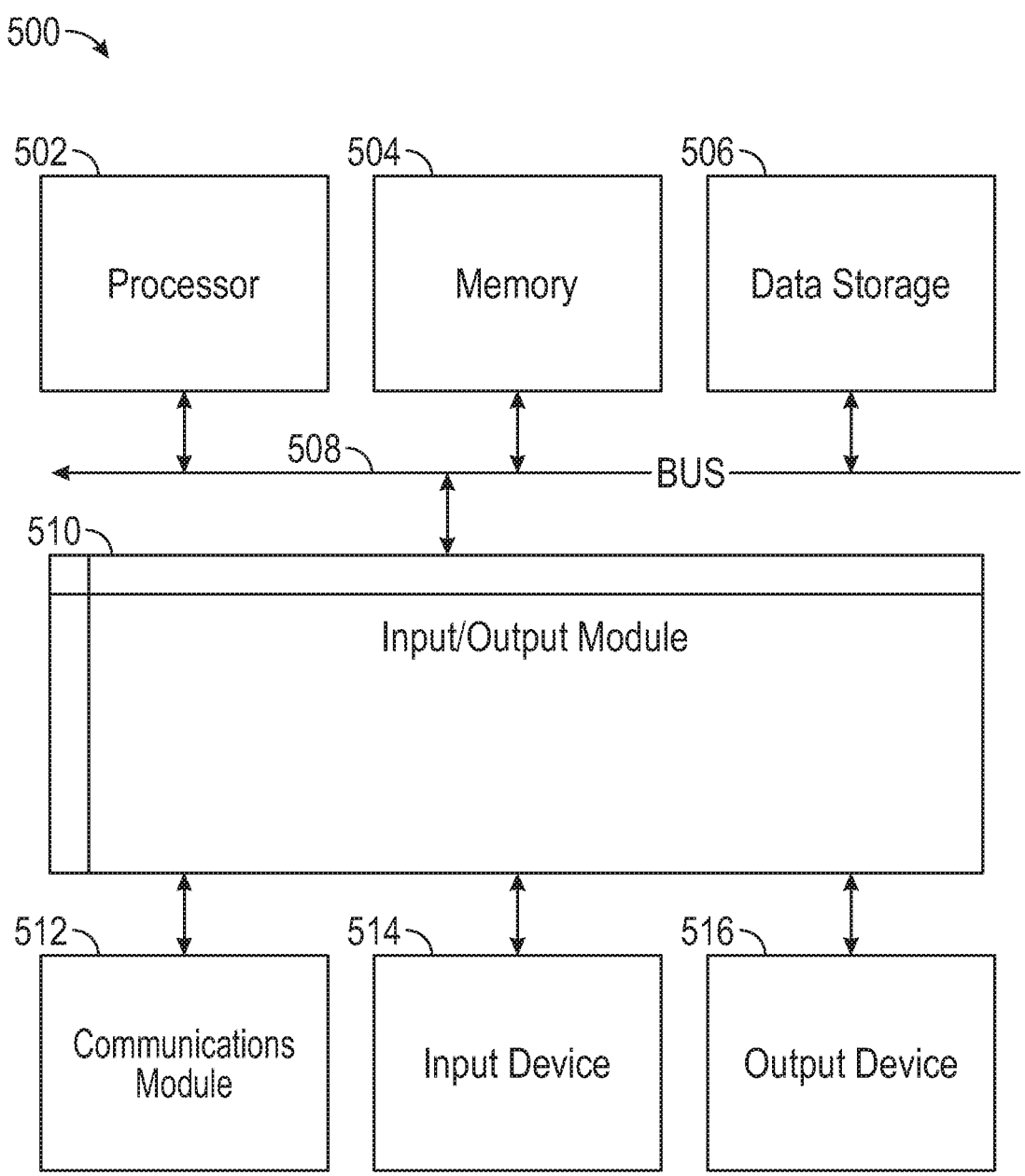
FIG. 5 is a block diagram illustrating an example computer system with which aspects of the subject technology may be implemented.

FIG. 5 is a block diagram illustrating an exemplary computer system 500 with which aspects of the subject technology may be implemented. In certain aspects, the computer system 500 may be implemented using hardware or a combination of software and hardware, either in a dedicated server, integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, for example, code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multi-paradigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the devices and systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium (e.g., a non-transitory machine-readable storage medium encoded with instructions executable by at least one hardware processor of a network device) can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A method of using a system comprising a hardware processor, comprising:

receiving a command to generate histograms from data comprising a plurality of column groups;

identifying a superset from the plurality of column groups, the superset comprising a plurality of columns, and deriving a parent-child relationship with subsets of the superset to reduces overhead by optimizing usage of computer resources;

materializing, in a memory, a superset multi-column group for the superset;

identifying a first subset and a second subset of the superset from the plurality of column groups, the first subset comprising a first column group, and the second subset comprising a second column group;

determining that a subset prefix column of the first subset is same as a superset prefix column of the superset;

processing the first subset of the superset to form a first grouped resultset without a sort operation in response to determining that the subset prefix column of the first subset is the same as the superset prefix column of the superset to reduce usage of the computer resources in forming the first grouped resultset;

determining that a subset prefix column of the second subset is different from the superset prefix column of the superset;

sorting and merging, in the memory, the second subset of the superset to form a second grouped resultset in response to determining that the subset prefix column of the second subset is different from the superset prefix column of the superset; and generating a first histogram for the first grouped resultset of the first subset of the superset, and generating a second histogram for the second grouped resultset of the second subset of the superset, wherein the generating of the first and second histograms include cost determinations in terms of elapsed times for forming the superset and the subsets.

2. The method of claim 1, further comprising:
generating a histogram for the superset comprising the superset multi-column group.

3. The method of claim 1, wherein the first column group of the first subset comprises plural columns, and the second column group of the second subset comprises plural columns at least one of which is different from the plural columns of the first subset.

4. The method of claim 1, wherein the superset is a union of a plurality of subsets of columns, the plurality of subsets of columns comprising the first subset and the second subset.

5. The method of claim 1, further comprising:
performing rowcount and unique entry count (UEC) adjustments on the data.

6. The method of claim 1, further comprising:
setting a maximum number of columns to be considered to materialize the superset multi-column group.

7. The method of claim 1, further comprising:
storing, in the memory, the data utilized to generate the first and second histograms.

8. The method of claim 1, wherein the first column group of the first subset comprises a portion of columns of the plurality of columns, and wherein the portion of columns comprises multiple columns less than a quantity of columns of the plurality of columns.

9. A system, comprising:
a processor; and
a non-transitory storage medium comprising instructions executable on the processor to:
receive a command to generate histograms from data comprising a plurality of column groups;
identify a superset from the plurality of column groups, the superset comprising a plurality of columns, and derive a parent-child relationship with subsets of the superset to reduce overhead by optimizing usage of computer resources;
materialize, in a memory, a superset multi-column group for the superset;
identify a first subset and a second subset of the superset from the plurality of column groups, the first subset comprising a first column group comprising multiple columns, and the second subset comprising a second column group comprising multiple columns;
determine that a subset prefix column of the first subset is same as a superset prefix column of the superset;
process the first subset of the superset to form a first grouped resultset without a sort operation in response to determining that the subset prefix column of the first subset is the same as the superset prefix column of the superset to reduce usage of the computer resources in forming the first grouped resultset;
determine that a subset prefix column of the second subset is different from the superset prefix column of the superset;
sort and merge, in the memory, the second subset of the superset to form a second grouped resultset in response to determining that the subset prefix column of the second subset is different from the superset prefix column of the superset; and
generate a first histogram for the first grouped resultset of the first subset of the superset, and generate a second histogram for the second grouped resultset of the second subset of the superset, wherein the generating of the first and second histograms include cost determinations in terms of elapsed times for forming the superset and the subsets.

10. The system of claim 9, wherein the instructions are executable on the processor to:
generate a histogram for the superset comprising the superset multi-column group.

11. The system of claim 9, wherein the multiple columns of the second column group of the second subset comprise at least one column that is different from the multiple columns of the first column group of the first subset.

12. The system of claim 9, wherein the superset is a union of a plurality of subsets of columns, the plurality of subsets of columns comprising the first subset and the second subset.

13. The system of claim 9, wherein the data is stored in a storage, and the identifying of the first subset and the second subset uses the superset to avoid performing input/output (I/O) accesses of the storage to form the first subset and the second subset.

14. The system of claim 13, wherein the generating of the first histogram for the first grouped resultset of the first subset comprises applying a histogram algorithm on the first grouped resultset of the first subset that avoids I/O accesses of the storage to generate the first histogram.

15. A non-transitory machine-readable storage medium comprising that upon execution cause a system to:
receive a command to generate histograms from data comprising a plurality of column groups;
identify a superset from the plurality of column groups, the superset comprising a plurality of columns, and derive a parent-child relationship with subsets of the superset to reduce overhead by optimizing usage of computer resources;
materialize, in a memory, a superset multi-column group for the superset;
identify a first subset and a second subset of the superset from the plurality of column groups, the first subset comprising a first column group, and the second subset comprising a second column group;
determine that a subset prefix column of the first subset is same as a superset prefix column of the superset;
process the first subset of the superset to form a first grouped resultset without a sort operation in response to determining that the subset prefix column of the first subset is the same as the superset prefix column of the superset to reduce usage of the computer resources in forming the first grouped resultset;

determine that a subset prefix column of the second subset is different from the superset prefix column of the superset;

sort and merge, in the memory, the second subset of the superset to form a second grouped resultset in response to determining that the subset prefix column of the second subset is different from the superset prefix column of the superset; and generate a first histogram for the first grouped resultset of the first subset of the superset, and generate a second histogram for the second grouped resultset of the second subset of the superset, wherein the generating of the first and second histograms include cost determinations in terms of elapsed times for forming the superset and the subsets.

16. The non-transitory machine-readable storage medium of claim 15, wherein the data is stored in a storage, the identifying of the first subset uses the superset to avoid performing input/output (I/O) accesses of the storage to form the first subset, and the generating of the first histogram for the first grouped resultset of the first subset comprises applying a histogram algorithm on the first grouped resultset of the first subset that avoids I/O accesses of the storage to generate the first histogram.

17. The non-transitory machine-readable storage medium of claim 15, wherein the first column group of the first subset comprises plural columns, and the second column group of the second subset comprises plural columns at least one of which is different from the plural columns of the first subset.

18. The non-transitory machine-readable storage medium of claim 15, wherein the superset is a union of a plurality of subsets of columns, the plurality of subsets of columns comprising the first subset and the second subset.

* * * * *